United States Patent

[11] 3,614,599

[72] Inventor Thomas C. Gmuer
 South Britain, Conn.
[21] Appl. No. 73,141
[22] Filed Sept. 17, 1970
[45] Patented Oct. 19, 1971
[73] Assignee The Superior Electric Company
 Bristol, Conn.

[54] THREE-PHASE DELTA-CONNECTED VOLTAGE-REGULATING SYSTEM AND METHOD THEREFOR
 8 Claims, 3 Drawing Figs.
[52] U.S. Cl. ............................................. 323/44,
 307/17, 323/57, 323/120, 336/155
[51] Int. Cl. ......................................... H02m 5/10,
 H02p 13/04
[50] Field of Search ................................... 323/44, 45,
 57, 60, 61, 86, 88, 120; 336/155, 171; 307/17

[56] References Cited
UNITED STATES PATENTS

| | | | |
|---|---|---|---|
| 3,075,139 | 1/1963 | Balteau | 323/66 |
| 3,129,380 | 4/1964 | Lichowsky | 323/45 |
| 3,237,083 | 2/1966 | Williams | 323/44 X |

Primary Examiner—Gerald Goldberg
Attorney—Johnson & Kline

ABSTRACT: A system and method for regulating the voltage from a three-phase delta-connected source to a three-phase delta-connected load circuit that includes a voltage regulator for each phase with the input to each regulator being made to be conductively independent of the other phases, while the outputs of the regulators are interconnected into a three-phase delta connection with each regulator thereby being essentially unaffected by the power controlled in the other phases.

THREE-PHASE DELTA-CONNECTED VOLTAGE-REGULATING SYSTEM AND METHOD THEREFOR

The generation, transmission and utilization of electric power is mainly carried on with the use of multiple-phase circuits and machines. One specific common form is three-phase power in which the power is generated in three separate phases of an alternator with the phases being electrically united by either a delta or Y connection. In a Y connection a wire is connected to each phase and there may also be a common wire that is connected to the junction of the three phases, while in a delta connection each of the three wires is connected to the junction of two phases.

When it is desired to provide a voltage that is maintained at a substantially constant value in each of the phases, a voltage regulator or voltage stabilizer is connected to each of the phases. In a Y connection regulation is normally easily and effectively achieved, but in a delta connection it has heretofore been extremely difficult to regulate the voltage in each phase effectively to prevent unstable operation of each regulator. This is especially true when operating conditions cause the power controlled in each phase to be unequal and, thus, attempts to control voltage in the three phases, when the power is distributed around the three phases in, for example, the ratio of 100 percent, 100 percent and 10 percent, have not heretofore been reliably possible.

In addition, in the heretofore delta-connected systems, other undesirable effects have occurred, such as an increase in waveform distortion, poor transient performance, circulating currents between the phases, etc., which made each attempt to regulate such power essentially empirical. Moreover, as the inputs of the regulators have been interconnected together, each handled the vector sum of the current of two phases, and hence the regulators were required to have a current-handling capacity which was greater than the current that existed in just one phase.

It is accordingly an object of the present invention to provide a voltage-regulating system and method for three-phase delta-connected power which is capable of effectively regulating the voltage in each phase over a wide range of operating conditions.

Another object of the present invention is to achieve the above object with a system that has a regulator in each phase, but in which each regulator is not required to have the same power-handling capacity as has been heretofore required to maintain the output voltage constant for the same amount of power.

A further object of the present invention is to provide a system for controlling the value of voltage in each phase of a delta connection that is more economical to install than heretofore-known systems, and which is durable and reliable in use.

Still another object of the present invention is to provide for maintaining the voltage in each phase of the delta connection essentially constant by use of a regulator in each phase, whose performance characteristics in the system are essentially the same as when a regulator is used to control single-phase power.

In carrying out the present invention, the system is adapted to be interconnected between a source of three-phase delta-connected power, such as obtained from an alternator, and to supply three-phase delta-connected power to a load circuit with the voltage in each of the phases being maintained substantially constant at a selected value. The system includes a voltage regulator for each phase, with the regulators being identical in construction. In the herein-disclosed embodiment, each of the regulators is of the type that is used on single-phase power and specifically has a buck-boost transformer which adds or subtracts a regulating voltage to the input voltage in order to maintain the desired value of output voltage, though other types of regulators may be used.

The three leads from the delta-connected source are connected to the primary windings of a three-phase transformer having three primary windings interconnected to receive the three-lead delta power from the source. Each of the primary windings has a secondary winding, with both terminals of each secondary winding being connected only to the input terminals of its associated regulator, such that each regulator is thus only connected to one phase of the input power. The output terminals of the regulators, however, are interconnected to provide a three-lead delta-connected output which is thus usable by the load circuit.

In this manner, the present system utilizes a transformer which may be normally available for transforming the source voltage to approximately the desired load voltage, for making the three phases of the input source into individual phases that are each conductively independent of the other phases, thereby enabling each of the regulators to function as if it is only controlling single-phase power. Thus, each regulator will exhibit for its phase essentially the same performance characteristics which it has on single-phase power and, by being operationally independent, is not affected by differences in the other phases. Moreover, by separating the delta-connected input power into separate phases, the current controlled by each regulator is accordingly much less than if the regulators were interconnected in the heretofore conventional delta configuration.

Other features and advantages will hereinafter appear.

Referring to the drawing

Figure 1:
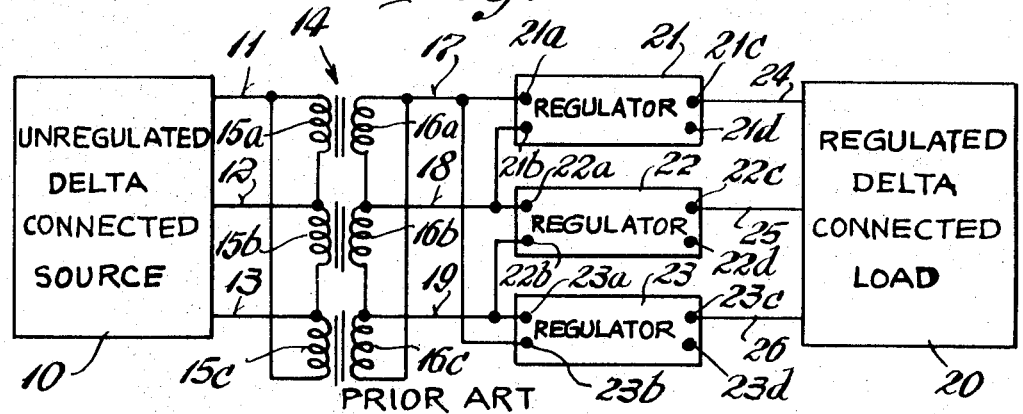
FIG. 1 is a block and schematic diagram of the prior art interconnections for providing voltage regulation between a delta-connected power source and a delta-connected load circuit.

Referring to the drawing, the prior art system shown in FIG. 1 includes an unregulated three-phase delta-connected source indicated by the block 10 that has three leads 11, 12 and 13 which are connected to a transformer generally indicated by the reference numeral 14. The transformer has three primary windings 15a, 15b and 15c, with each of the windings being connected to two of the leads 11 through 13 as shown.

The transformer 14 further includes three secondary windings 16a, 16b and 16c that are interconnected to have the output thereof appear as three-phase delta-connected power on leads 17, 18 and 19. Interconnected between the leads 17–19 and a delta-connected load circuit 20, to which it is desired to supply delta-connected power that has a constant value of voltage, are three voltage regulators 21, 22 and 23. Usually, the transformer 14 consists of three separate transformers, each with its own core and windings, but can be a three-phase, common core transformer having three isolated secondary windings.

Referring to the regulator 21, it has a pair of input terminals 21a and 21b that are connected to the leads 17 and 18 and an output terminal 21c that is connected by a lead 24 to the load circuit 20, together with an unconnected output terminal 21d.

The regulator 22 has its input terminals 22a and 22b connected to leads 18 and 19 and one of its output terminals 22c connected to the load circuit 20 by a lead 25, while the output terminal 22d is unconnected. The regulator 23 is connected in a similar manner by its input terminals 23a and 23b being connected to leads 17 and 19 and one output terminal 23c being connected to the load circuit 20 by a lead 26, with the other output terminal 23d being unconnected.

It will be seen that, with such a system wherein the transformer 14 performs its usual function of only changing the value of the voltages between its primary windings and secondary windings, that it merely provides to the regulators a voltage that is approximately that desired by a load 20. Each regulator has its input connected to two of the phases of the delta connection of the secondary windings and each phase may affect the operation of the regulator. Moreover, each of the regulators by reason of being connected to two phases must be capable of handling the quantity of power which appears in its output leads; and, thus, if each of the leads 24–26 is required to have 173 amperes, then each regulator must have a capacity to control 173 amperes. As pointed out above, the present prior art interconnections for regulating three-phase delta connection power has been found to produce many difficulties in use.

Figure 2:
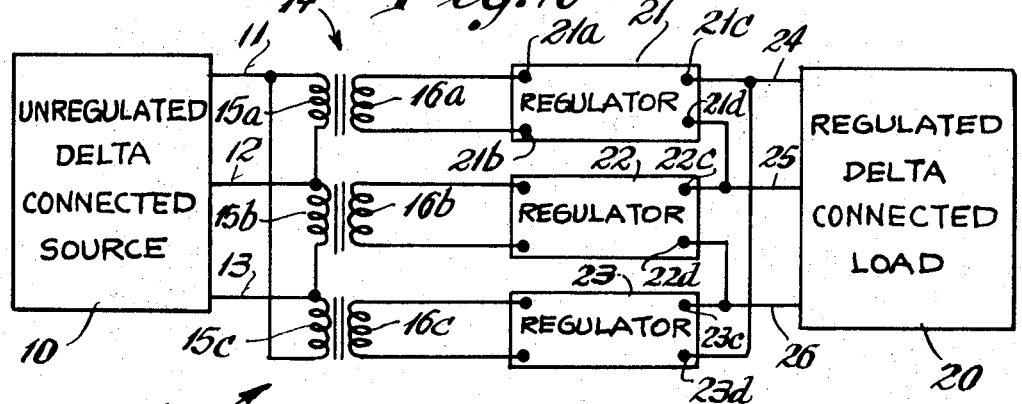
FIG. 2 is a block and schematic diagram of the system of the present invention for providing a regulated voltage from a delta-connected source to a delta-connected load circuit.

Referring to FIG. 2, the three-phase delta-connected voltage-regulating system of the present invention is generally indicated by the reference numeral 27, and not only includes all of the components utilized in the prior art system but requires no others. Thus there is the unregulated delta-connected source 10, the transformer 14 having primary windings 15a, 15b and 15c, together with secondary windings 16a, 16b and 16c and the delta-connected load 20 to which three-phase delta-connected power, having a constant value of voltage, is supplied over leads 24, 25 and 26 from the regulators 21, 22 and 23. The primary windings of the transformer 14 are interconnected to the leads 11–13 from the source in the same manner as in the prior art embodiment.

In accordance with the present invention, each of the secondary windings is made to be connected to be independent of the other secondary windings, and thus the ends of the secondary windings are not interconnected. Specifically, the regulator 21 has its input terminals 21a and 21b connected to the ends of the secondary winding 16a, while the other regulators 22 and 23 also have their two input terminals connected to the ends of their associated secondary windings 16b and 16c respectively. Accordingly, the power to each of the regulators is only the power which is induced in its associated winding and thus, in effect, is to each regulator only single-phase power.

For providing the power to the load circuit 20 in a delta configuration, the output terminals 21c and 21d of the regulator 21 are connected to the leads 24 and 25, respectively. Similarly, the regulator 22 has its output terminals 22c and 22d connected to the leads 25 and 26, and the output terminals 23c and 23d of the regulator 23 are connected to the leads 26 and 24, respectively.

It will thus be seen that the three-phase delta-connected voltage-regulating system of the present invention utilizes the same components as is required in the prior-art system. However, as the prior art system requires each regulator to share the output current in two of the three leads 24, 25 and 26, its capacity must be such as to handle the maximum power that appears in each of these leads. On the other hand, the present system has each of the regulators operationally independent of the other phases, and hence is not required to have the capability of controlling the amount of current in the output leads 24–26. Specifically, the regulators 21–23 need only to have the capability of handling $\frac{1}{\sqrt{3}}$ times the current in each of the leads 24, 25 and 26. Thus, if each lead 24, 25 and 26 supplies 173 amperes, the regulators 21–23 of the present system need only a current capacity of 100 amperes. As the cost of regulators is generally proportional to their current-handling capacity (or size), the use of a smaller size regulator thereby substantially reduces the cost of the regulators which are required in the present system.

Figure 3:
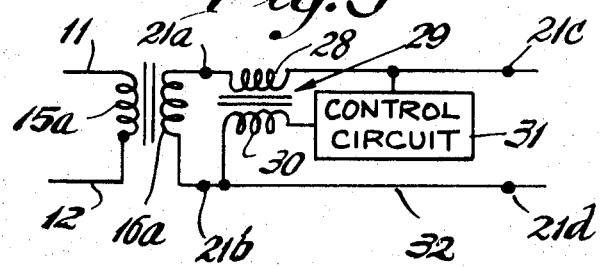
FIG. 3 is a block and schematic diagram showing some details of a regulator which may be employed in the present system.

Shown in FIG. 3 is a diagrammatic representation of the voltage regulator 21, the other regulators being identical. It has connections to the winding 16a while the primary winding 15a is connected to the leads 11 and 12. The regulator output terminals 21c and 21d are connected as described in FIG. 2. Interconnected between the terminals 21a and 21c is a winding 28 of a buck-boost transformer 29 having an input winding 30, which controls the power in the winding 28 and hence the regulating voltage which appears in the winding 28, with the regulating voltage maintaining the value of voltage at the output terminals 21c and 21d at a selected value. A control circuit 31 regulates the voltage to the input winding 30. It will be noted that the terminals 21b and 21d are directly connected by a lead 32.

For a specific example of a regulator which may be employed in the present invention, reference is made to U.S. Pat. application Ser. No. 799,629, filed Feb. 17, 1969 by Owen J. McCabe and assigned to the assignee of the present invention. While a specific embodiment of the regulator has been disclosed as being utilizable in the system, it will be apparent that the invention is not limited to a specific type of regulator, but may be used with other types such as those employing tapped auto transformer means as disclosed in U.S. Pat. No. 3,370,223, also assigned to the assignee of the present invention.

The regulators used in the present three-phase delta-connected system may be identical in construction to regulators used with single-phase power, thus permitting one regulator to be usable without internal alteration in both the present system and single-phase systems. Also, it has been found that, in order to maintain the phase relationship between the phases, it is preferred to have the regulators be essentially identical so as not to cause excessively different phase shifting by the regulators in each phase.

It will accordingly be appreciated that there has been disclosed a three-phase delta-connected voltage-regulating system and method which is capable of providing to a load circuit a constant value of voltage in each of the phases of the delta connection. The system is usable over a wide range of operating conditions by reason of each of the regulators being made to be operationally independent of each of the other phases, and thus functions as if it were handling only single-phase power.

Accordingly, the performance of each of the regulators has essentially the same qualities as it has with a single-phase source, and is capable of satisfactorily operating under adverse conditions such as caused by the phases handling different quantities of power. Moreover, while achieving substantial advantages over prior art systems in performance, the present system enables use of regulators which have a much lower current-handling capacity, thereby enabling more economical regulators to be employed.

Variations and modifications may be made within the scope of the claims and portions of the improvements may be used without others.

I claim:

1. A system for regulating the value of voltage from a three-phase delta-connected source to a three-phase delta-connected load circuit comprising means connected to the source for providing three source outputs, each of said source outputs consisting of only one phase of the source and being conductively independent of each other, three distinct regulating means with each having an input and an output and functioning to maintain a constant value of voltage at its output, means connecting each regulating means to only one source output and means connecting the outputs of the regulators together in a three-phase delta connection to the load circuit.

2. The invention as defined in claim 1 in which the output of each regulating means includes a first and a second output terminal and in which the means interconnecting the output terminals interconnects the second terminal of one regulating means to the first terminal of another regulating means with the first terminals supplying the delta-connected power to the load circuit.

3. The invention as defined in claim 2 in which each regulating means includes a pair of input terminals and in which one input terminal of each regulating means is connected to be common with one output terminal.

4. The invention as defined in claim 3 in which each regulator includes means for providing a regulating voltage and in which said means is interconnected between the other input and output terminals.

5. The invention as defined in claim 1 in which each of said regulating means has a pair of input terminals, in which each source output consists of a pair of leads and in which the leads of one source output are only connected to the input terminals of one regulating means.

6. The invention as defined in claim 1 in which the means for providing the source outputs includes a transformer having three distinct primary and secondary windings, means connecting the primary windings in a three-phase delta configuration and to the three-phase delta-connected source, and in which each secondary winding provides a source output.

7. The invention as defined in claim 6 in which the input of each regulating means includes two terminals and in which the means connecting each regulating means to a source output consists of connecting the input terminals to the ends of a secondary winding.

8. The method of regulating the voltage from a three-phase delta-connected source to a three-phase delta-connected load circuit comprising the steps of separating each phase of the source from the other phases, maintaining substantially constant the value of voltage in each phase and recombining the regulated voltages into a three-phase delta configuration and supplying same to the load circuit.